United States Patent [19]

Harris et al.

[11] Patent Number: 5,074,111
[45] Date of Patent: Dec. 24, 1991

[54] SEAL PLATE WITH CONCENTRATE ANNULAR SEGMENTS FOR A GAS TURBINE ENGINE

[75] Inventors: Derek P. Harris; Stacey H. Light, both of San Diego, Calif.

[73] Assignee: Sundstrand Corporation, Rockford, Ill.

[21] Appl. No.: 291,103

[22] Filed: Dec. 28, 1988

[51] Int. Cl.$^5$ .............................. F02C 7/28; F02C 3/08
[52] U.S. Cl. .................................... 60/39.37; 60/39.32
[58] Field of Search .............. 60/39.32, 39.36, 39.37, 60/39.75; 415/170.1, 178

[56] References Cited

U.S. PATENT DOCUMENTS

| | | | |
|---|---|---|---|
| 2,911,138 | 11/1959 | Birmann | 230/116 |
| 2,946,192 | 7/1960 | Hambing | 60/39.36 |
| 3,116,908 | 1/1964 | Wosika | 60/39.36 |
| 3,266,250 | 8/1966 | Freeman et al. | 60/39.36 |
| 3,613,360 | 10/1971 | Howes | 60/39.36 |
| 3,623,318 | 10/1971 | Shank | 60/39.36 |
| 4,009,568 | 3/1977 | King et al. | 60/39.32 |
| 4,439,871 | 4/1984 | Weiler et al. | 60/39.32 |
| 4,446,693 | 5/1984 | Pidcock et al. | 60/757 |
| 4,932,207 | 6/1990 | Harris et al. | 415/170.1 |

*Primary Examiner*—Richard A. Bertsch
*Assistant Examiner*—Timothy S. Thorpe
*Attorney, Agent, or Firm*—Wood, Phillips, Mason, Recktenwald & VanSanten

[57] ABSTRACT

The clearance between a seal assembly 46 and a turbine wheel 14 in a turbine engine of the type having a radial outflow compressor 24 and a radial inflow turbine wheel 14 may be minimized by utilizing a diaphragm assembly 76 as part of the seal assembly 46 and which is formed of multiple pieces in the form of concentric rings 78, 80. In addition, the thermal stress in the rings 78 and 80 will be considerably less than in a single ring as used in existing designs. This greatly extends the useful life of the seal plate assembly before the onset of cracking and other kinds of mechanical failure.

3 Claims, 2 Drawing Sheets

SEAL PLATE WITH CONCENTRATE ANNULAR SEGMENTS FOR A GAS TURBINE ENGINE

FIELD OF THE INVENTION

This invention relates to turbine engines, and more particularly, to seals utilized to isolate the compressor and turbine sections of turbine engines having radial outflow compressors and radial inflow turbines.

BACKGROUND OF THE INVENTION

In many turbine engines of the type utilizing radial outflow compressors coupled to radial inflow turbines, the compressor and the turbine wheel are located in back to back relationship for compactness. Usually, an annular, narrow space exists between the two for thermal isolation purposes. That is, the space is provided to prevent undue quantities of heat from being transmitted from the turbine wheel to the compressor as a result of heating of the turbine wheel by hot gases of combustion.

While the space achieves such an objective, it presents a difficulty in that it must be sealed to prevent the flow of compressed gases from the compressor side of the machine to the turbine side of the machine through such space at the interface between the rotor and the stator of the machine. Further, the sealing of such space should be such that the seal itself does not transmit unduly large quantities of heat from the turbine side of the engine to the compressor side.

To solve this difficulty, it has been conventional to provide an annular seal made up of two components. A first is a forward seal plate which is secured by any suitable means to the engine stator on the compressor side thereof and which extends into the space between the compressor and the turbine into almost touching relation to the boundary of the space at its radially inner extremity. This seal plate holds down passage of gas from the compressor side to the turbine side of the engine to some desired amount (frequently, a small amount of gas passage is preferred to provide for some rotor cooling). However, it is not capable of preventing heat transfer from the turbine side of the engine to the compressor side.

In order to minimize such heat transfer, prior art seals additionally include a so-called diaphragm which is a relatively thin, ring-shaped piece of metal which is mounted on the forward seal plate near its radially outer periphery and extends radially inwardly therefrom to have its radially inner edge suitably mounted to the seal plate. The main body of the diaphragm is spaced from the seal plate thereby establishing an air pocket between the two which severely impedes heat transfer from the turbine side of the engine to the compressor side.

During engine operation, extremely high temperatures are generated at the turbine side of the engine. As a consequence, the seal plate and the diaphragm are subjected to thermal cycling and the diaphragm in particular experiences significant thermal growth in the process. Furthermore, there is a substantial thermal gradient radially across the seal assembly. These two factors result in distortion of the diaphragm during various operating conditions and will cause cracking leading to eventual failure. In order to prevent such distortion from resulting in interfering contact between the turbine wheel and the diaphragm, the clearance between the two must be kept relatively large. And, of course, utilizing a relatively large clearance increases the cross sectional area of the leakage flow path between the turbine and seal plate. The natural result is, of course, increased leakage and decreased operational efficiency of the engine.

The present invention is directed to overcoming one or more of the above problems.

SUMMARY OF THE INVENTION

It is the principal object of the invention to provide a new and improved turbine engine. More specifically, it is an object of the invention to provide a turbine engine of the radial discharge compressor—radial inflow turbine type with an improved seal plate whereby clearances between the seal plate and the turbine may be minimized to reduce performance losses.

An exemplary embodiment of the invention achieves the foregoing objects in a gas turbine engine including a radial outflow, rotary compressor and radial inflow turbine wheel that are coupled together in spaced, back to back relation so that the turbine wheel may drive the compressor. A housing surrounds the compressor and the turbine wheel and a stationary seal is mounted on the housing and extends into the space between the compressor and the turbine wheel. The seal includes a main sealing and support section adjacent the compressor and a multiple piece diaphragm mounted to the main section but generally spaced therefrom. The pieces of the diaphragm are movable with respect to each other and with respect to the main section and further are sealed to each other and to the main section.

In a highly preferred embodiment, the diaphragm is made up of concentric rings.

In a preferred embodiment, the diaphragm has two pieces including a radially inner ring and a radially outer ring.

Preferably, one of the rings includes a lip which overlaps an edge of the other of the rings. The lip and the edge are in sliding, sealing engagement.

In a highly preferred embodiment, the lip is formed by an additional ring secured to the one ring and the one ring is the radially outer ring.

The invention also contemplates that the main section be an annular, forward seal plate which in turn is provided with an annular, inner seal plate located at its radially inner edge which extends radially inwardly into the space between the turbine wheel and the compressor. The seal plates, at their interface, define a radially outwardly opening annular groove which in turn receives the radially inner diaphragm segment or section.

Other objects and advantages will become apparent from the following specification taken in connection with the accompanying drawings.

DESCRIPTION OF THE PREFERRED EMBODIMENT

Figure 1:
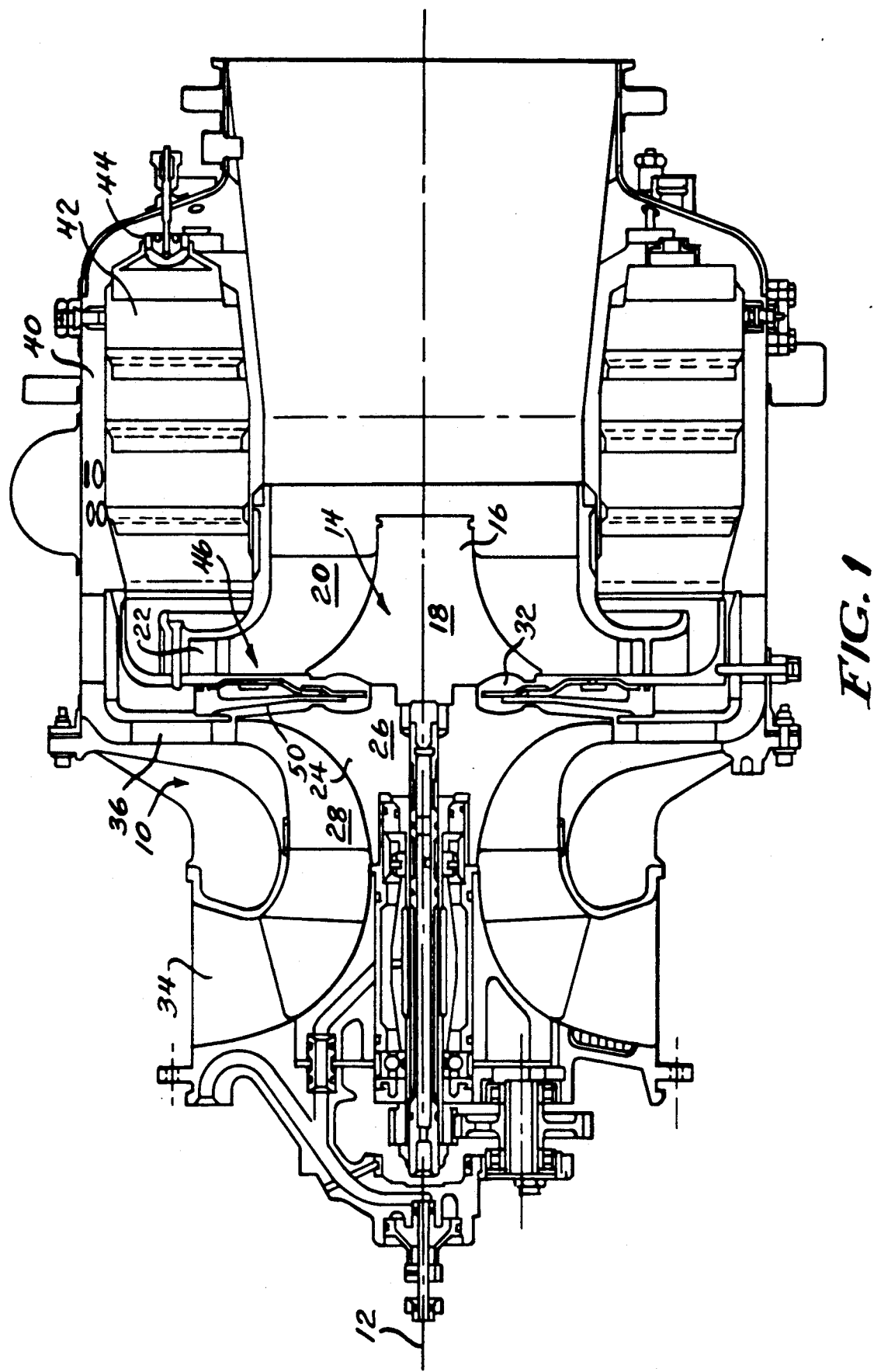
FIG. 1 is a sectional view of a gas turbine engine employing a seal made according to the invention.

An exemplary embodiment of a gas turbine engine that may be provided with a seal plate according to the invention is illustrated in FIG. 1 and is seen to include a stationary housing, generally designated 10. Journaled within the housing for rotation about an axis 12 is a rotor, generally designated 14. The rotor 14 in turn is made up of a radial inflow turbine wheel 16 having a hub 18 and blades 20 located to receive hot gases of combustion directed radially inward by an annular nozzle 22. The rotor 14 further includes a rotary compressor 24 including a hub 26 and peripheral blades 28. The turbine wheel 16 and compressor 24 are coupled together by any suitable means including, for example, a pin 30, for conjoint rotation. It will be observed that a radially inward directed, annular space 32 exists between the turbine wheel 16 and the compressor 24.

During operation, the air from an inlet 34 to the machine is compressed by the blades 28 and directed radially outwardly through a diffuser 36. The compressed air is then passed through an annular plenum 40 which surrounds an annular combustor 42. Air is admitted to the interior of the combustor 42 and as is well known, combined therein with fuel injected by injectors 44 to produce gases of combustion. The combustor 42 includes an outlet in fluid communication with the nozzle 22.

To seal the area between the diffuser 36 and the nozzle 22 as well as the space 32, a seal assembly, generally designated 46, is utilized.

Figure 2:
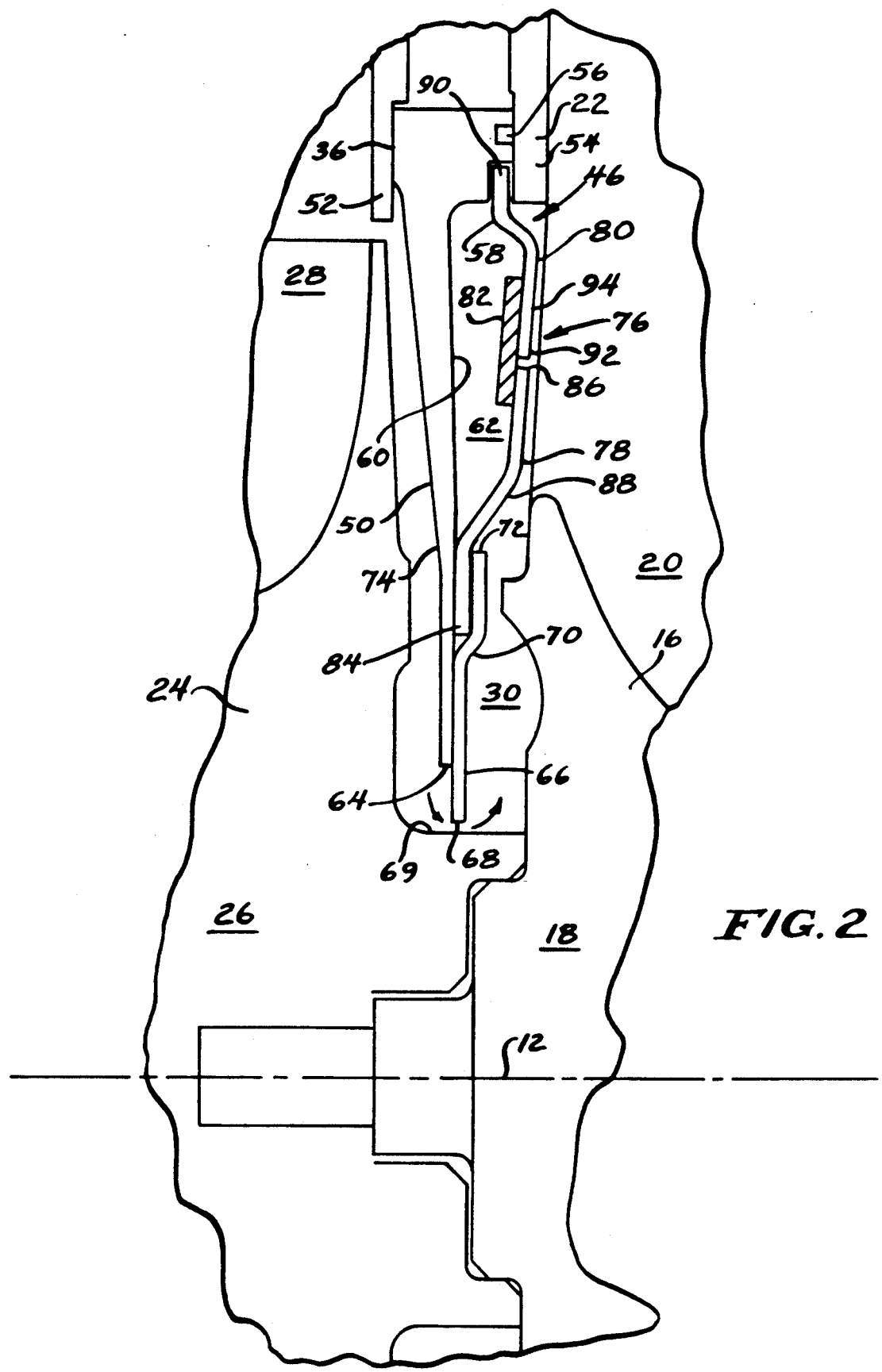
FIG. 2 is an enlarged, fragmentary, sectional view of the turbine illustrating the improved seal assembly.

As seen in FIG. 2, the seal assembly 46 includes a forward seal plate 50 that may be sandwiched between a part 52 of the diffuser 36 and a component 54 of the nozzle 22. The forward seal plate 50 serves as a main sealing and support section for purposes to be seen. An axially facing groove 56 may be utilized to provide a seal and a radially inwardly opening annular step 58 is located adjacent the component 54 of the nozzle 22 for purposes to be seen. In addition, the side 60 of the forward seal plate 50 facing the turbine side of the engine is somewhat concave as shown to assist in defining a dead air space 62 for insulation purposes.

Near its radially inner edge 64, the forward seal plate 60 mounts an inner seal plate 66 which has its radially inner edge 68 in close proximity to the radially innermost boundary 69 of the space 30 between the turbine wheel 16 and the compressor 24.

Intermediate its radially inner and outer edges, the inner seal plate includes a jog 70. As a consequence, its radially outer edge 72 is spaced from the forward seal plate 50 to define a radially outwardly opening groove 74.

A diaphragm assembly, generally designated 76, is mounted to the forward seal plate 50 at the annular step 58 and the groove 74. According to the invention, the diaphragm assembly 76 is made up of a plurality of segments, specifically three rings 78, 80 and 82. The ring 78 is a radially inner ring and has its radially inner edge 84 disposed in the groove 74 for retention purposes. The radially outer edge 86 of the ring 78 is located approximately radially midway of the dead air space 62 and between the edges 84 and 86 is a jog 88 which serves to increase the axial length of the dead air space 62.

The radially outer ring 80 includes a radially outer edge 90 disposed slideably between the step 58 and the housing component 54 and a radially inner edge 92 aligned with but spaced radially outwardly from the radially outer edge 86 of the ring 88.

The ring 82 is secured to the radially inner edge 92 of the ring 80 as by spot welds 94 and extends radially inwardly past the edge 92 on the side of the ring 80 remote from the turbine 16. The ring 82 extends radially inwardly past the edge 86 of the ring 78 and defines a lip which slideably and sealingly engages the side of the ring 78 remote from the turbine 16.

The components are sized so that at maximum operating temperature, the edge 90 of the radially outer ring 80 will be in virtual abutment with the mating part of the forward seal ring 50 but not stressed as the result of any engagement therewith. Similarly, the space between the edges 86 and 92 of the rings 78 and 80 respectively will be virtually closed.

As a consequence of this construction, thermal gradients in the radial direction cannot distort the diaphragm assembly 76. This is because of the relatively short radial length of each segment provided by using multiple rings 78 and 80. Stated another way, even though the thermal gradient across the entire diaphragm assembly 76 may remain the same as with a conventional diaphragm, the gradient across each of the rings 78 and 80 will be commensurately less so that such rings will be less prone to distortion. This in turn enables the clearance between the diaphragm assembly 76 and the turbine wheel 16 to be minimized to improve operating efficiency of the machine.

In addition, the thermal stress in the rings 78 and 80 will be considerably less than in a single ring as used in existing designs. This greatly extends the useful life of the seal plate assembly before the onset of cracking and other kinds of mechanical failure.

We claim:

1. A gas turbine engine comprising:
a radial outflow, rotary compressor;
a radial inflow turbine wheel;
means coupling said compressor and said turbine wheel in slightly spaced back to back relating so that said turbine wheel may drive said compressor;
a housing surrounding said compressor and said turbine wheel; and
a stationery seal mounted on said housing and extending into the space between said compressor and said turbine wheel, said seal including a main sealing and support section adjacent said compressor and a multiple piece diaphragm mounted to said main section, but generally spaced therefrom, the pieces of said diaphragm being movable with respect to each other and with respect to said main section, and further being sealed to each other and to said main section, and including a radially inner ring and a radially outer ring, one of said rings including a lip which overlaps an edge of the other of said rings, said lip and said edge being in sliding, sealing engagement.

2. The gas turbine engine of claim 1 wherein said lip comprises an additional ring secured to said one ring.

3. The gas turbine engine of claim 2 wherein said one ring is said radially outer ring.

* * * * *